Feb. 7, 1967   J. A. ZUPEZ ETAL   3,302,985
JOURNAL STOP DEVICES

Filed April 2, 1964   5 Sheets-Sheet 1

Inventors
John A. Zupez
Llewellyn E. Hoyer
By Wallace, Kinzer and Dorn
Attorneys Inventor
John A. Zupez
Llewellyn E. Hoyer
By Wallace, Kinzer and Dorn
Attorneys Feb. 7, 1967   J. A. ZUPEZ ETAL   3,302,985
JOURNAL STOP DEVICES
Filed April 2, 1964   5 Sheets-Sheet 3
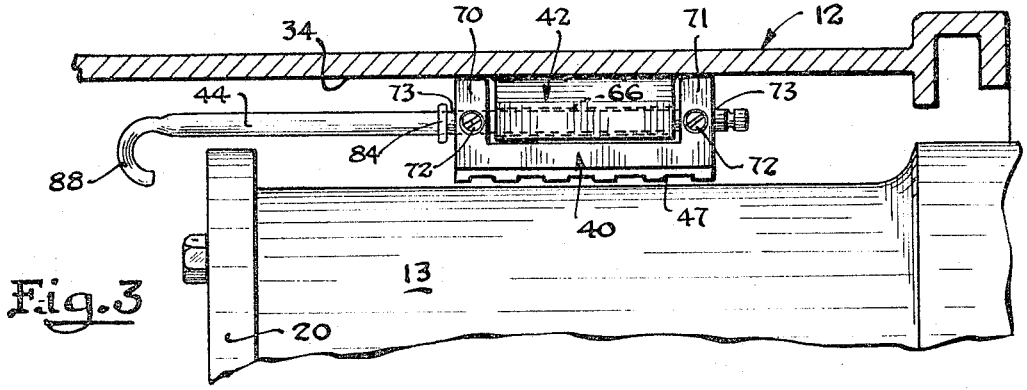
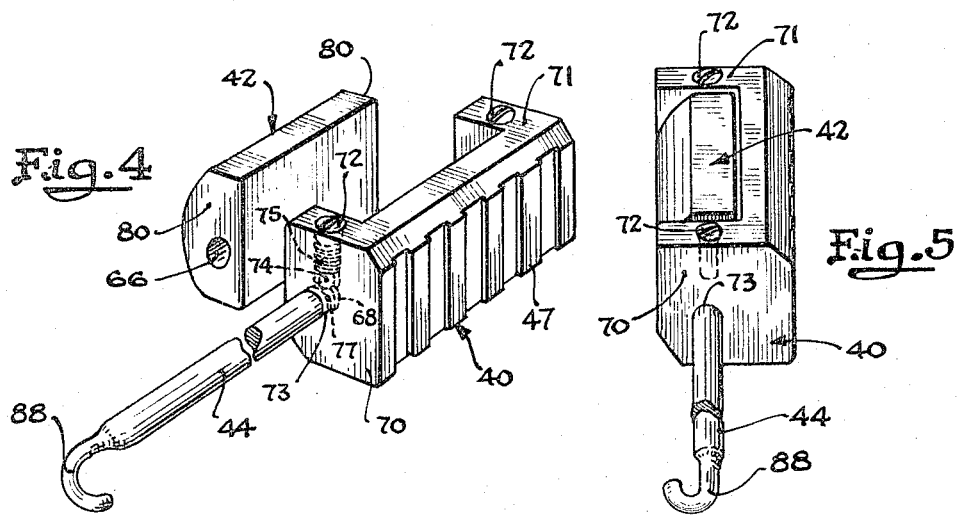
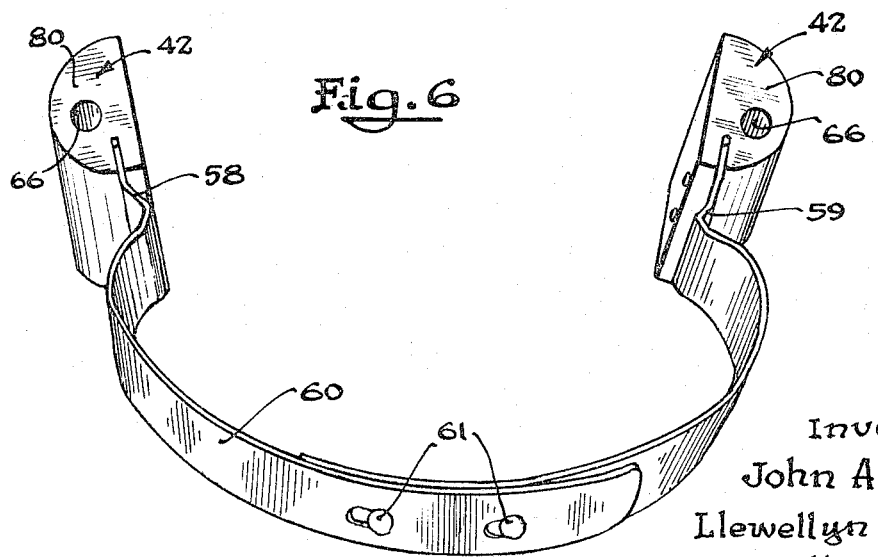
Inventors
John A. Zupez
Llewellyn E. Hoyer
By Wallace, Kinzer and Dorn
Attorneys Feb. 7, 1967   J. A. ZUPEZ ETAL   3,302,985
JOURNAL STOP DEVICES
Filed April 2, 1964   5 Sheets-Sheet 4
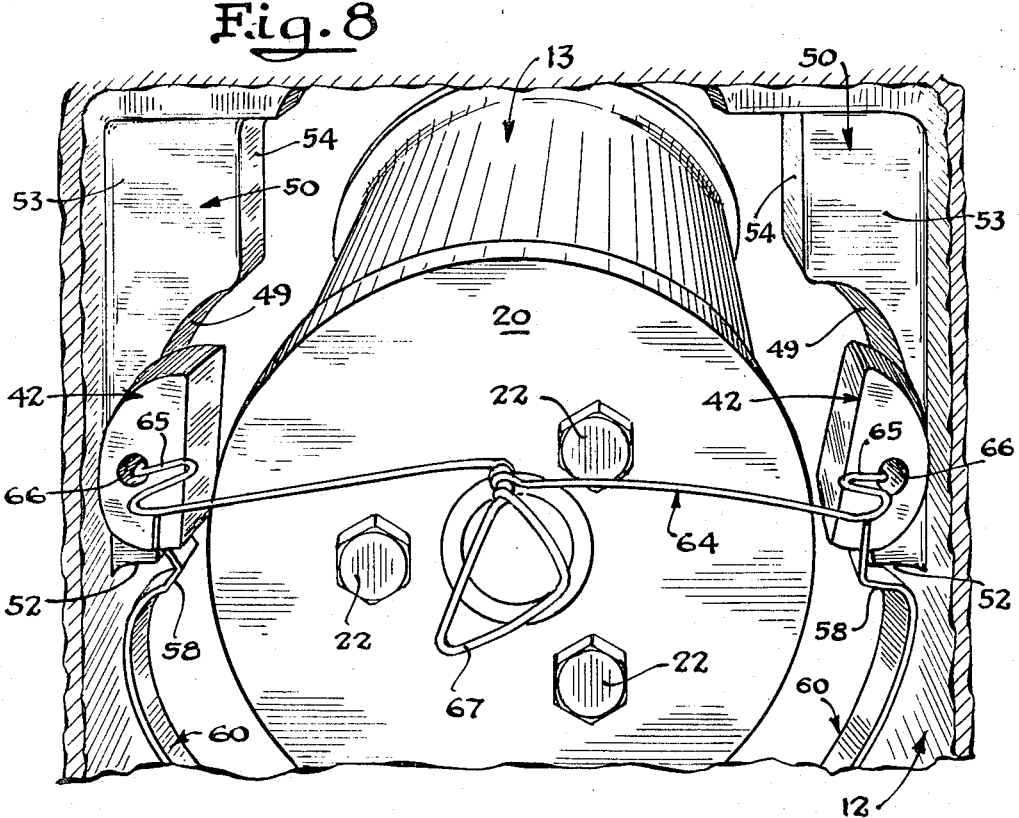
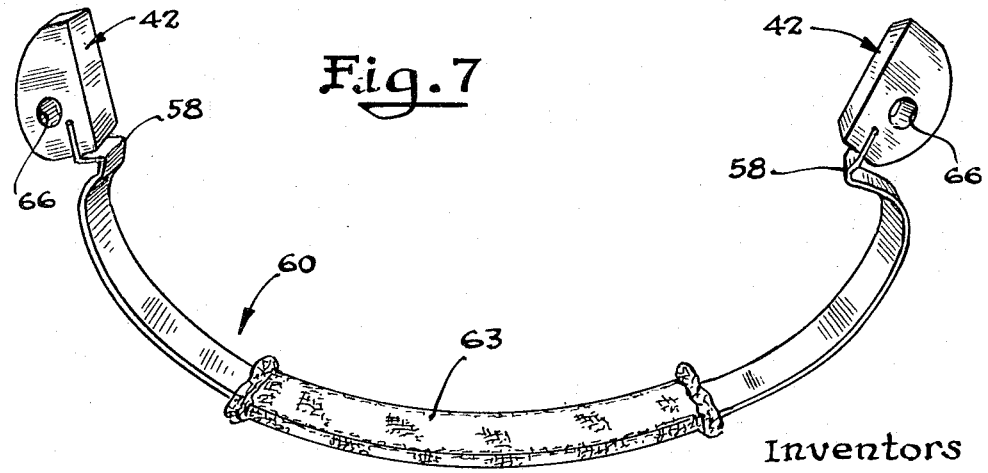
Inventors
John A. Zupez
Llewellyn E. Hoyer
By Wallace, Kinzer and Dorn
Attorneys

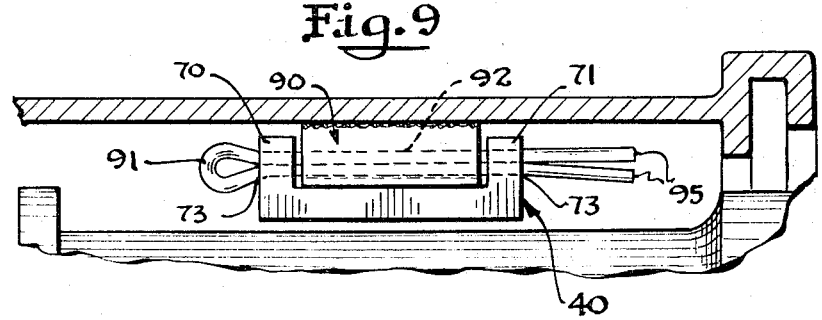
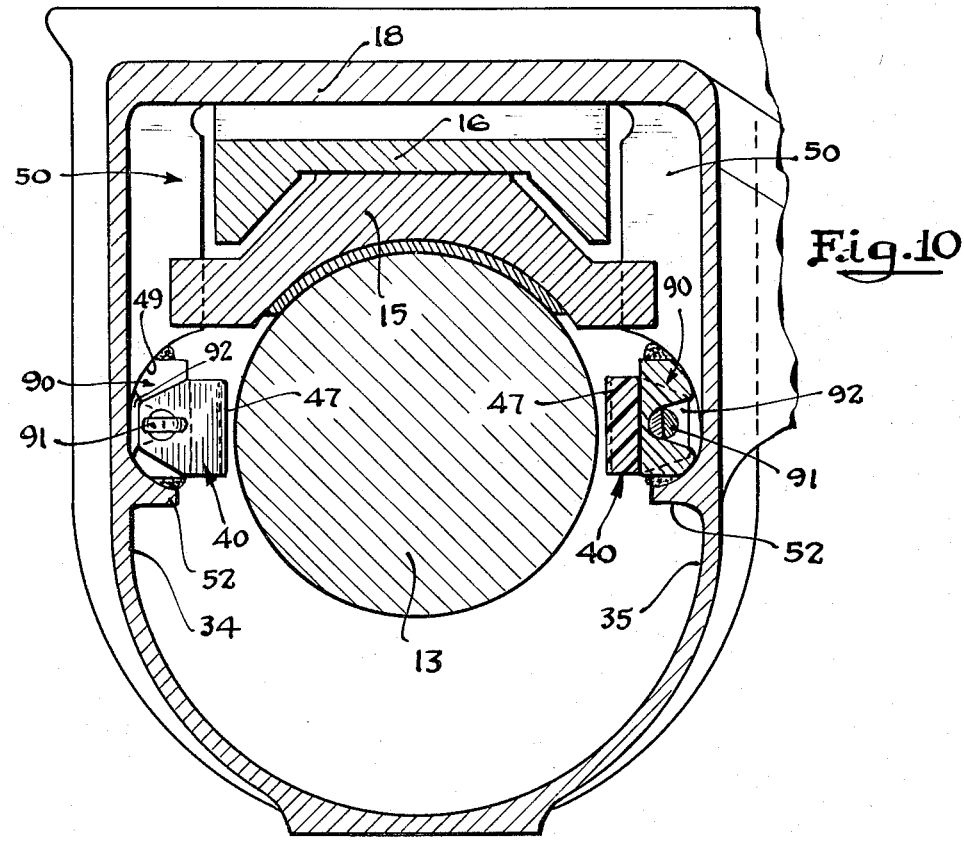

3,302,985
JOURNAL STOP DEVICES
John A. Zupez, Ridgewood, and Llewellyn E. Hoyer, Wayne, N.J., assignors to Abex Corporation, a corporation of Delaware
Filed Apr. 2, 1964, Ser. No. 356,809
2 Claims. (Cl. 308—40)

This invention relates to journal stop devices for the journals of a railroad car, and more particularly to a device for preventing excessive lateral movement of an axle journal in the journal box of a railroad car by a journal stop device.

The axle journal of a railroad car axle is disposed in a journal box with lubricating fluid and a lubricating means below the journal and a bearing above the journal. The end of the journal projects toward an access opening in the outer wall of the journal box for permitting inspection and maintenance of the bearing and lubricating means for the journal. A collar, having a diameter substantially larger than the diameter of the journal, is secured to the end of the journal. Because of the relatively large diameter of the collar access therepast and further into the journal box is quite limited. Thus, the collar on the journal renders access difficult to the journal stop devices which are disposed inwardly of the collar and along the side walls of the journal box. The journal stops limit the lateral displacement of the journal towards either one of the side walls of the journal box.

Heretofore, installation of journal stops has been quite difficult, as the collar on the journal leaves only a small space for moving journal stops inwardly into the journal box past the large diameter collar. Likewise removal and replacement of journal stops, which have become worn or otherwise need to be replaced, are rendered difficult by the narrow space between the walls of the journal box and the collar.

This lack of working space renders it extremely difficult to insert prior art journal stops past the journal collar or to bring the journal stops back past the collar on the end of the journal. Accordingly, the primary object of the present invention is to facilitate the installation and the removal of journal stop devices by affording a journal stop of novel construction including a separable supporting portion and a separable and renewable journal engaging portion, each adapted to be separately installed and each having lesser dimensions than the dimensions of the combined support and journal engaging portion of prior art one-piece construction.

According to a more specific object of the invention, during installation and removal of the renewable journal engaging portions, the journal engaging portions are adapted to be supported on the ends of relatively long pins and thus can be inserted past the collar on the journal without necessitating manipulating one's fingers about the collar or inside the journal box, thereby eliminating this safety hazard. Under this object of the invention, each of the renewable journal stop portions is held in position on a separate support having an aperture therein to receive the elongated pin so that by thrusting the elongated pin through the aperture in the support the renewable insert is pinned to the support and is secured in proper position adjacent the axle journal. The pin is of sufficient length so that the operator's hand need not be inserted completely into the journal nor into the space between the collar and the walls of the journal box either when installing or removing a renewable journal stop.

The replaceable journal stop portions are adapted, according to a further object of the invention, to embrace the projecting side walls of the stop columns on the sides of the journal box to prevent axial displacement of the journal stop portions relative to the journal.

According to another embodiment of the invention, the support means for the renewable journal stop portions are disposed on the opposite ends of a flexible band so that a simple tool may be employed to move the supports and band past the collar on the journal and into position at the stop columns and waste ledges of the journal box. Under a further object of the invention, the supports for the renewable stop elements are secured to individual supporting bands held in a telescoped relationship so that the bands can be moved relative to one another to accommodate the contour of a particular journal box.

According to another embodiment of the invention, and as a further object of the invention, the supports for the renewable journal stops are constituted by apertured blocks fastened to the walls of the journal box, and oriented to receive the elongated pivot pin for the journal stop portions being inserted through the access opening in the journal box.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 3 is a plan view illustrating the elongated holding pin extending outwardly past the collar on the end of the journal;

FIG. 4 is a perspective view of a renewable journal stop adapted to be positioned on a support block;

FIG. 5 is a perspective view showing the renewable journal stop positioned on the support block with the holding pin inserted in the support block;

FIG. 6 is a perspective view of a flexible band having a support block on its opposite ends;

FIG. 7 is a perspective view of a pair of telescoping bands each carrying a support block;

FIG. 8 is a perspective view of a tool being employed to insert the support blocks carried on the end of the flexible band;

FIG. 9 is a plan view partially in section of a journal stop secured by a cotter pin inserted through the support block; and FIG. 10 is a sectional view showing the sectional opening in the support block for the cotter pin of the embodiment of the invention, as shown in FIG. 9.

Figure 2:
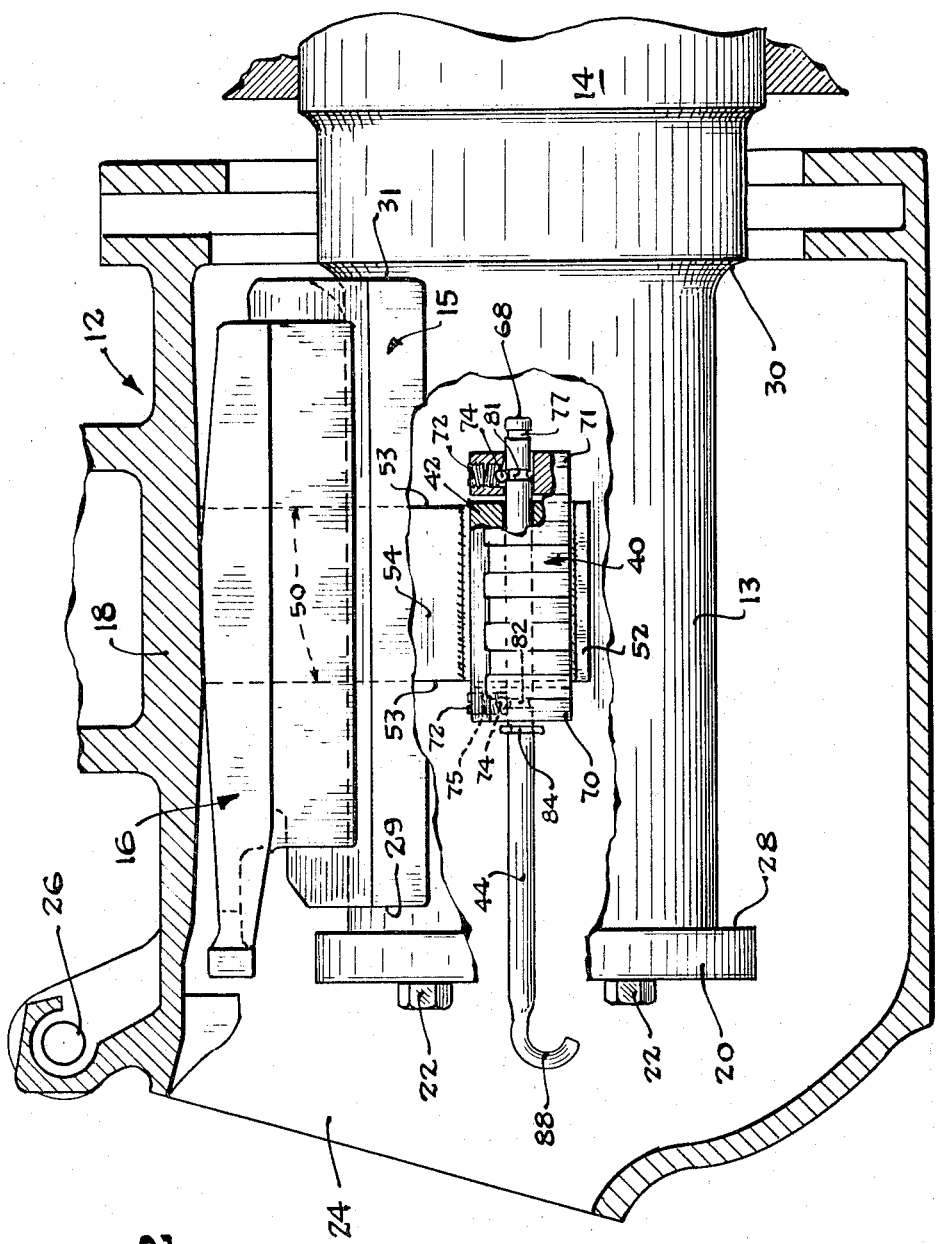
FIG. 2 is a partial sectional view showing the mounting of a renewable journal stop on an elongated holding pin.

Referring now to the drawings, and more particularly to FIG. 2, there is shown a conventional journal box 12 in which is disposed a journal 13 of a wheel axle 14 of a railroad car. The journal 13 rotates in engagement with a superimposed bearing 15 held against the upper surface of the journal 13 by a wedge 16 disposed between the upper portion 18 of the journal box and the bearing 15, in the conventional manner, as will be familiar to those skilled in the art.

The journal 13 has affixed to its outer free end a collar 20 fastened to the journal by a plurality of cap screws 22. The collar 20 is of a significantly larger diameter than the diameter of the journal 13 and is disposed forwardly in the journal box 12 towards an access opening 24, which can be closed by a suitable cover (not shown). The cover for the access opening 24 would be pivoted on a boss 26 extending upwardly at the forward end of the upper wall 18 of the journal box 12.

During movements of the railroad car, the journal 13 undergoes axial movement relative to the bearing 15 and is limited in the rightward or inward direction, FIG. 2, by a thrust surface 28 on the collar 20 for engaging an adjacent thrust surface 29 on the bearing 15. The journal 13 is limited against axial movement in the leftward or outward direction, FIG. 2, by a thrust surface 30 on the axle 14 adjacent a thrust surface or collar 31 on the rearward portion of the bearing 15.

Figure 1:
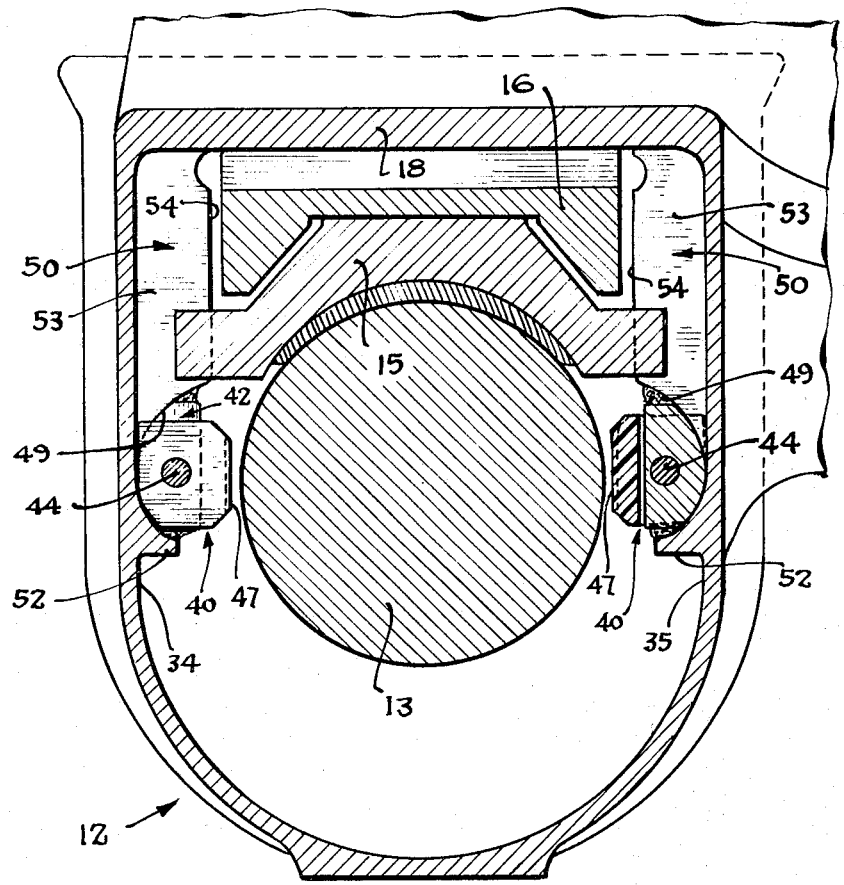
FIG. 1 is a sectional view showing the journal disposed in a journal box and renewable journal stops pivotally mounted adjacent the journal, in accordance with the present invention.

The axle 14 and journal 13 also partake of lateral or sideways movement relative to vertical side walls 34 and 35 of the journal box 12, FIG. 1. For the purpose of limiting this lateral movement of the journal 13 relative to the opposed side walls 34 and 35 of the journal box 12, many of the journal boxes are provided with journal stops or wedges which are disposed adjacent the peripheral surface of the journal 13 to be momentarily contacted by the journal 13 as the journal 13 attempts to move towards the side walls 34 or 35 associated with the journal stop.

Because of the limited space between the side walls 34 and 35, particularly at the collar 20, installation of a journal stop device on existing railroad equipment or replacement of journal stops on existing equipment is difficult and time-consuming. This is particularly true when it is realized that the spacing between the collar at the side walls 34 and 35 is barely, if wide enough, to permit the fingers of an operator to be moved past the collar 20, no less affording adequate working space for the operator's hands.

The present invention is directed to a construction of a journal stop particularly adapted to relieve problems of replacement and installation within the narrow confines of a journal box 12 by a novel construction of a journal stop wherein the journal stop is divided into a journal engaging or journal stop portion 40 and a supporting block or portion 42 adapted to be secured together in a novel manner by a combined inserting and mounting pin 44.

With the journal stop device properly installed, the journal stops 40 are positioned with their respective journal contacting faces 47 disposed adjacent diametrically opposed surfaces on the periphery of the journal 13 and the journal stops 40 are secured on the retainer blocks 42 by the mounting pins 44.

The journal stops may be made from bronze or bronze alloys of a composition having impact resistance strength and resistance to scoring upon contact by the journal. Also, the journal stops may be made from a low friction plastic material such as nylon, Teflon or the like. The contacting faces 47 of the journal stops are serrated or grooved in a vertical direction. The contacting faces 47 are serrated to retain oil in the grooves, and thus provide retention of lubricant between journal 13 and face 47 when the journal 13 moves to engage the face 47. Also, the serrations reduce the frictional surface area of contact between the journal 13 and the journal stop.

Each of the supporting blocks 42 is nested in an arcuate surface 49 in one of the stop columns 50 formed in the opposed side walls 34 and 35 of the journal box 12. As will be understood by those familiar with the art, the conventional journal boxes normally are constructed with a pair of inwardly cast projections or columns 50 in the respective side walls 34 and 35 of the journal box 12. The columns 50, usually referred to as stop columns, extend downwardly from the upper wall 18 of the journal box 12 to an arcuate surface 49 leading to waste retainer ledges 52, at which the stop columns 50 terminate, FIGS. 1 and 8.

As best seen in FIGS. 1, 2 and 8, the stop columns 50 are positioned slightly rearward of the center of the journal box and are provided with a pair of spaced projecting walls 53 projecting inwardly from the remainder of the side walls 34 and 35 to terminate in a front wall 54.

In the embodiment of the invention shown in FIG. 1, the mounting blocks 42 are shown welded in position on the surface 49 of the stop column 50, and thus provide a permanent mounting block or support for receiving renewable journal stops 40. This type of construction is particularly adapted to original equipment or equipment undergoing repair wherein the journal has been removed from the journal box 13.

However, for installations on existing equipment with the journal 13 already disposed in the journal box 12, it is preferred to mount the supporting blocks 42 on opposite ends 58 and 59 of a flexible band 60, FIG. 6. The flexible band 60 can be made of spring steel or of a plastic material capable of being flexed and having a resistance to deterioration by the lubricating oil in the journal box. Also, the flexible band 60 can be of one-piece construction or can be of two-piece construction joined by rivets 61 as shown in FIG. 6.

A further alternative is a band 60 of two-piece construction with the opposite ends of the bands slidably disposed in telescoping relationship within a sleeve 63, as in FIG. 7. The sleeve 63 may be of a cotton type fabric or may be of a plastic fabric or plastic material. As will be understood, the insertion of the band 60 and its attached stops 42 into the journal box 12 causes the flexible band 60 to be flexed or placed in tension. Thus, the band 60 urges the blocks 42 to move farther apart and away from each other and to space the blocks 42 at a distance apart available when the band 60 is in its unflexed condition.

Even though the supporting blocks 42 are considerably thinner than the width of prior art combined or one-piece prior art journal stop devices, any difficulty in placing the blocks 42 in position is alleviated by employment of a tool 64, FIG. 8, of bent wire which has its end portions 65 positioned in apertures 66 of the blocks 42. Thus, by grasping the handle 67 of the tool 64, the blocks 42 can be lifted upwardly over and past the collar 20, moved downwardly, and inserted into the arcuate surfaces 49 without the requirement of the operator attempting to move his fingers past the column 20. Thus, because of the reduced thickness of the supporting blocks 42 from that of the prior art devices which contain both the combined supporting block and journal stop, the supporting block 42 of the present invention can be more readily moved past the collar 20.

With the supporting blocks 42 in place, the renewable journal stops 40 are positioned on the pin 44 with only the front tip portion 68 of the pin 44 inserted into a forward leg 70 of the U-shaped journal stop 40, as seen in FIG. 4. As best seen in FIG. 2, both the forward leg 70 and a rearward leg 71 of the journal stop 40 are provided with vertical apertures leading to receiving openings 73 for the mounting pin 44 in the legs 70 and 71 of a journal stop 40. The apertures are tapped to receive a set screw 72 threaded into the aperture. The set screw 72 holds a spring 75 therein and thereby urges a detent ball 74 against the mounting pin 44.

When the tip portion 68 of the pin 44 is inserted within the forward leg 70, the detent ball 74 is engaged with a first necked or reduced diameter portion 77 on the mounting pin 44 to prevent the sliding of the journal stop 40 relative to the tip portion 68 of the pin 44. Thus, by grasping a handle portion 88 thereon, the operator is able to lift a journal stop 40 and insert the journal stop 40 over the collar 20 and move the journal stop 40 to bring the legs 70 and 71 into position to embrace the opposed vertical side walls 80 on the supporting block 42. Upon alignment of the tip portion 68 of the mounting pin 44 with the aperture 66 in the support block 42, the operator thrusts the tip portion 68 rearwardly through the aligned aperture 66 in the support block 42 and in the aligned aperture 73 in the rearward leg 71.

The pin 44 is inserted until the respective detent balls 74 seat in the grooves 81 and 82, FIG. 2, respectively. If desired, the mounting pin 44 can be provided with a stop washer or collar 84 to limit insertion of the pin to the predetermined amount as the stop washer 84 engages the forward leg 70 of the block 42 whereupon there is assurance that the grooves 81 and 82 on the mounting pin 44 will be disposed in detenting relationship with their respective detent balls 74.

Preferably, the legs 71 and 72 project sufficiently outwardly toward either of the side walls 34 or 35 so that the legs 71 and 72 embrace the spaced surfaces 80 of its supporting block 42 and also extend to embrace the projecting walls 53 of the stop columns 50. Because the journal stops 40 extend to embrace the stop columns 50, shifting or axial movement of the journal stops 40 and supports 42 relative to the stop columns 50 of the journal box 12 is prevented. Manifestly, the same journal stops 40 can be used with either the support blocks 42 welded in place, FIG. 1, or secured on a flexible band 60, FIG. 8.

The manner of removal of the journal stops 40 should be apparent from the hereinbefore description of the insertion and installation of the journal stop devices. However, briefly, removal of a journal stop 40 is accomplished by grasping the handles 88, FIG. 3, of the pins 44 extending outwardly of the journal column 20 and pulling the mounting pins 44 forwardly toward the access opening 24 in the journal box 12. When the grooves 77 in the tip portions 68 of the pins 44 are detented by the detent ball 74 in the forward leg 70 in the journal stop 40, the mounting pins 44 are no longer inserted into the supporting blocks 42, and the journal stops 40 can be lifted upwardly and centrally towards the bearing 15 and then moved forwardly past the collar 20 and out through the access opening 24. If, for some reason it is desired to remove the supporting blocks 42, the tool 64 can be employed to insert its ends 65 into the openings 66 in the support blocks 42. Thereafter, the support blocks 42 can be pulled forwardly and maneuvered about the journal collar 20 and moved outwardly through the access opening 24 in the journal box 12.

In the embodiment of the invention shown in FIGS. 9 and 10, the journal stop 40 is secured to a supporting block 90 by means of a cotter pin 91. While the supporting block 90 for the journal stops 40 is shown welded to the stop columns 50, in the manner hereinbefore described, it is understood that the supporting blocks 90 can be attached to the ends of a flexible band 60 of one-piece construction or of two-piece telescoping construction, in the manner of supporting blocks 42. The supporting block 90 is similar to the supporting blocks 42 described hereinbefore except that the supporting block has a non-circular groove 92 therein in lieu of a circular opening or groove 66 in the supporting blocks 42. The groove 92 opens further toward the side wall of the journal stop, that is, the walls of the groove 92 flare outwardly toward the vertical wall of the journal box and provide clearance for the slightly expanded legs 95 of the cotter pin 91.

To mount the journal stop 40 with a cotter pin 91, the slightly opened ends 95 of the cotter pin are first disposed in the opening 73 in the leg 70 of the journal stop 40. Thus, the journal stop 40 is disposed on the end of the cotter pin 91 and held against turning thereon by the enlarged end 95 expanded into engagement with the interior walls of the opening 73 of the leg 70 of the journal stop 40. Once the journal stop 40 is correctly positioned over the supporting block 90, the cotter pin 91 is thrust through the groove 92 in support block 90 and the end 95 inserted through the opening in the leg 71 of the journal stop 40. Thus, the expanded end 95 of the cotter pin expands to its free state and is prevented from axial movement to disconnect the journal stop 40 under the influence of vibratory forces. Thus, it will be recognized that the cotter pin 91 does not require the formation of grooves therein nor the use of detent devices as required by the previously described embodiments of the invention.

From the foregoing it will be seen that the present invention also involves a method facilitating installation of journal stops 40 on supporting blocks, which includes the following steps: disposing the end of an elongated pin in an opening in the journal stop, holding the pin and moving the journal stop on the end of the pin into position on a supporting block, and thrusting the supporting pin through an aligned opening in the supporting block to retain said journal stop on said supporting block. The method of removal of the journal stop comprises the following steps: pulling the retaining pin through the supporting block, leaving the retaining pin engaging the axially outward opening in one leg of the journal stop 40 and lifting the journal stop on the end of the retaining pin outwardly through the access opening in the journal box.

Also from the foregoing, it will be seen that the present journal stop device is constructed of a journal stop and supporting block which facilitates the method of installation and removal of the journal stops on and from the support blocks by means of an elongated retaining pin 40 or 91. Also, the journal stops 40 are adapted to have leg portions thereof 70 and 71 adapted to embrace the side walls of the stop column 50 to prevent axial movement of the journal stops 40 and their support blocks, particularly when the support blocks are not fixedly secured to the journal box.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. A journal stop device adapted to be positioned in a railroad journal box, said journal stop device including a pair of support means each to be positioned on opposite sides of the journal box; individual journal stop means each individually mounted on a related one of said support means, each of said journal stop means having a journal contacting face thereon, each of said support means and each of said journal stop means having registered openings therein, a pair of mounting pin means each adapted to extend through said registered openings to secure related journal stop means to its respectively associated support means, said mounting pin means including a handle portion extending outwardly and adapted to be clasped by an operator, and spring detenting means on each of said journal stop means to hold said journal stop means on said mounting pin means in a first position when said journal stop means is being positioned about its support means to register said openings, said detenting means also operable to hold said mounting pin means against axial movement when said pin means is in its operative holding position within said registered openings.

2. A journal stop device adapted to be positioned in a railroad journal box, said journal stop device including a pair of support means each positioned on opposite sides of the journal box; a pair of journal stop means each individually mounted on a related one of said support means; each of said support means and each of said stop means having registered openings therein; each of said journal stop means having a journal contacting face thereon; a pair of mounting pin means each adapted to secure a journal stop means to its respectively associated support means, said stop means each being in the form of a U-shaped member having first and second legs presenting the openings therein to receive said mounting pin means when said mounting pin means is inserted through an opening in the support means for the respective journal stop means, and spring detenting means on each of said journal stop means to hold the journal stop means on the related one of said mounting pin means in a first position when said journal stop means is being positioned about its support means; said detenting means being operable to hold its mounting pin means against axial movement when said pin means is in its operative holding position with said support means, said mounting pin means including a handle portion extending outwardly toward the access opening and adapted to be clasped by an operator while maneuvering journal stop means.

References Cited by the Examiner

UNITED STATES PATENTS

| | | | |
|---|---|---|---|
| 3,027,203 | 3/1962 | Sweger | 308—38 |
| 3,115,374 | 12/1963 | Johnson | 308—40 |
| 3,154,354 | 10/1964 | Bohmer | 308—40 |

MARTIN P. SCHWADRON, *Primary Examiner.*

FRANK SUSKO, *Examiner.*

DAVID J. WILLIAMOWSKY, *Assistant Examiner.*